US010822473B2

(12) United States Patent
Jia et al.

(10) Patent No.: US 10,822,473 B2
(45) Date of Patent: Nov. 3, 2020

(54) ELECTRICALLY-CONDUCTIVE CURABLE ORGANOSILICON RUBBER

(71) Applicant: ELKEM SILICONES SHANGHAI CO., LTD., Shanghai (CN)

(72) Inventors: Liya Jia, Shanghai (CN); Yuanzhi Yue, Shanghai (CN)

(73) Assignee: ELKEM SILICONES SHANGHAI CO., LTD., Shanghai (CN)

( * ) Notice: Subject to any disclaimer, the term of this patent is extended or adjusted under 35 U.S.C. 154(b) by 0 days.

(21) Appl. No.: 16/067,447

(22) PCT Filed: Dec. 29, 2016

(86) PCT No.: PCT/CN2016/112828
§ 371 (c)(1),
(2) Date: Jun. 29, 2018

(87) PCT Pub. No.: WO2017/114440
PCT Pub. Date: Jul. 6, 2017

(65) Prior Publication Data

US 2019/0023874 A1 Jan. 24, 2019

(30) Foreign Application Priority Data

Dec. 31, 2015 (CN) .......................... 2015 1 1027739

(51) Int. Cl.

| | |
|---|---|
| ***C08K 7/06*** | (2006.01) |
| ***C08K 3/04*** | (2006.01) |
| ***C08L 83/04*** | (2006.01) |
| ***C08J 5/00*** | (2006.01) |
| ***H01B 1/24*** | (2006.01) |
| *C08G 77/20* | (2006.01) |
| *C08G 77/12* | (2006.01) |

(52) U.S. Cl.
CPC ................. *C08K 7/06* (2013.01); *C08J 5/005* (2013.01); *C08K 3/04* (2013.01); *C08L 83/04* (2013.01); *H01B 1/24* (2013.01); *C08G 77/12* (2013.01); *C08G 77/20* (2013.01); *C08J 2383/04* (2013.01); *C08K 2201/001* (2013.01); *C08K 2201/004* (2013.01)

(58) Field of Classification Search
None
See application file for complete search history.

(56) References Cited

U.S. PATENT DOCUMENTS

2015/0176930 A1* 6/2015 Zhao ..................... H01L 23/373 165/185
2018/0237630 A1* 8/2018 Bae ......................... C08L 77/02

FOREIGN PATENT DOCUMENTS

| | | |
|---|---|---|
| CN | 100999607 A | 7/2007 |
| CN | 101942202 A | 1/2011 |
| CN | 102010600 A | 4/2011 |
| CN | 102206419 A | 10/2011 |
| CN | 102276988 A | 12/2011 |
| CN | 102382616 A | 3/2012 |
| CN | 102604388 A | 7/2012 |
| CN | 103525093 A | 1/2014 |

OTHER PUBLICATIONS

PCT International Search Report for PCT/CN2016/112828, dated Apr. 10, 2017.

* cited by examiner

*Primary Examiner* — William D Young
(74) *Attorney, Agent, or Firm* — McBee Moore & Vanik IP, LLC

(57) ABSTRACT

The present invention relates to a carbon fiber-containing curable organosilicon composition and a method for preparing the carbon fiber-containing organosilicon composition. The present invention also relates to the electrically conductive rubber obtained by curing the carbon fiber-containing organosilicon composition and its uses. The curable organosilicon composition comprises: (A) a polysiloxane base composition, and (B) a carbon fiber component; wherein, the carbon fiber component comprises, based on the weight of (A) polysiloxane base composition, 2 to 300%, preferably 5 to 250%, more preferably 15 to 150% of a carbon fiber with average length of 10 μm to 5000 μm, preferably 30-3500 μm, more preferably 60-3000 μm with the provisos that: (1) if the carbon fiber component comprises exclusively carbon fiber with average length of not greater than 200 μm, its content is greater than 25%; and (2) if the carbon fiber component comprises exclusively carbon fiber with average length of greater than 2800 μm, its content is not greater than 40%.

15 Claims, No Drawings

ELECTRICALLY-CONDUCTIVE CURABLE ORGANOSILICON RUBBER

CROSS-REFERENCE TO RELATED APPLICATIONS

This application is a National Stage entry of International Application No. PCT/CN2016/112828, filed Dec. 29, 2016, which claims priority to Chinese Patent Application No. 201511027739.2, filed Dec. 31, 2015.

BACKGROUND

Technical Field

The present invention relates to a carbon fiber-containing curable organosilicon composition and a method for preparing the carbon fiber-containing curable organosilicon composition. The present invention also relates to the electrically conductive rubber obtained by curing the carbon fiber-containing organosilicon composition and its uses especially as electrically-conductive elements in fields of electronics, automobiles, aerospace, high-speed railway, communication, electric power, medicine and wearable intelligent devices.

Description of Related Art

Electrically-conductive rubber can be prepared by dispersing an electrically-conductive filler in a rubber matrix. Its mechanical performances and electrical conductivity could be adjusted in a large range, and they develop rapidly due to the advantages like stable conductivity, good processability and excellent mechanical performances. This kind of electrically-conductive rubber is widely used in fields of electronics, communication, electric power, medicine, aerospace, automobiles, railway, etc. With the swift development of electronic industry and expansion of its application market, the electrically-conductive rubber is further applied in fields of intelligent wearable devices, sensors, electromagnetic shielding, etc.

Among numerous polymer materials, the organosilicon rubber with polysiloxane matrix is widely used as electrically-conductive rubber matrix due to its excellent weather resistance, temperature tolerance, biocompatibility, electrical performance. Usually, the organosilicon materials have a volume resistivity of greater than $10^{10}$ Ω·cm, and are mainly used as insulant materials. However, its electrical conductivity can be regulated by adding an electrically-conductive filler. In general, a composite material would be called as semiconductor if its volume conductivity is $10^7$ to $10^9$ Ω·cm, as antistatic material if its volume conductivity is $10^4$ to $10^7$ Ω·cm, as electrically-conductive material if its volume conductivity is 10 to $10^4$ Ω·cm, and as highly conductive material if its volume conductivity is $10^{-5}$ to $10^0$ Ω·cm. For an electrically-conductive silicon rubber useful in electromagnetic shielding field, its volume conductivity is usually required to be less than 1 Ω·cm.

Common electrically-conductive fillers include metallic fillers and carbon-based fillers. Metallic fillers have excellent conductivity, and are important fillers for preparing highly conductive silicon rubber. Common metallic fillers include aluminum powder, iron powder, nickel powder, copper powder, silver powder, gold powder. However, aluminum powder, iron powder and nickel powder are liable to be oxidized in air thereby leading to the poor stability and the decrease in conductivity; while gold powder and silver powder are very expensive. Carbon-based fillers mainly include carbon black and graphite.

For example, Chinese patent CN102382616 B discloses a highly conductive organosilicon composite material prepared using various kinds of metallic powders such as copper powder, silver powder, nickel powder as main fillers. However, since a large amount of metallic powder has to be added to achieve a high conductivity and also due to the high density of metallic filler, the obtained electrically-conductive silicon rubber usually has a high density. Thus, it is not suitable for some applications where portability is desired.

Chinese patent CN100999607B discloses an electrically-conductive silicon rubber prepared by compression molding process using a carbon black with BET specific area of 50-200 $m^2/g$ and DBP oil absorption of 120-280 ml/100 g. The carbon black has a relatively low cost and possesses the reinforcement effects on rubber matrix, thereby improving weather resistance and abrasive resistance. However, the addition of carbon black is very prone to cause a sharp increase in viscosity of silicon rubber system, which significantly restricts the addition amount of carbon black and deteriorates workability. Especially, when high electrical conductivity is required, a large amount of carbon black may have to be added, which leads to more difficult processing technologies such as compression molding, etc. In the meantime, a silicon rubber with carbon black usually has a volume resistivity that can hardly be decreased to below 1 Ω·cm, as renders it impossible to be used in high conductivity fields.

SUMMARY

Hence, there is still the need for an organosilicon rubber with further improved conductivity, which can be regulated with regard to the electrical conductivity in a broader range (e.g., volume resistivity ranging from 0.01 to 100000 Ω·cm), and has advantages such as good processability, regulable mechanical properties, good stability, low density, etc., and thus can be used in the application fields such as antistatic, electrical conducting and electromagnetic shielding and so on.

It has been surprisingly found that the above technical problems could be solved by adding into a curable organosilicon composition a certain amount of carbon fiber with a specific length as conductive filler. In comparison with graphite and carbon black, the addition of a carbon fiber into the curable organosilicon composition according to the present invention can result in more excellent and regulable conductivity. In addition, in comparison with carbon black, carbon fiber would not incur a sharp increase of viscosity of the polysiloxane matrix, as is beneficial for the workability and mechanical properties of the composite.

Hence, the first aspect of the present invention relates to a curable organosilicon composition, which comprises:

(A) a polysiloxane base composition, and (B) a carbon fiber component;

wherein the carbon fiber component comprises, based on the weight of (A) polysiloxane base composition, 2 to 300%, preferably 5 to 250%, more preferably 15 to 150% of a carbon fiber with average length of 10 μm to 5000 μm, preferably 30-3500 μm, more preferably a carbon fiber with average length of 60 to 3000 μm, with the provisos that: (1) if the carbon fiber component comprises exclusively carbon fiber with average length of not greater than 200 μm, its content is greater than 25%, preferably greater than 30%; and (2) if the carbon fiber component comprises exclusively carbon fiber with average length of greater than 2800 μm, its content is not greater than 40%, preferably not greater than 30%, more preferably not greater than 15%.

DETAILED DESCRIPTION OF A PREFERRED EMBODIMENT

Advantageously, in the curable organosilicon composition, the carbon fiber component comprises, based on the weight of (A) polysiloxane base composition, 10 to 150% of a carbon fiber with average length of 10 to 2500 μm.

The second aspect of the present invention relates to a method for preparing the curable organosilicon composition as described above, comprising the step of mixing uniformly (A) polysiloxane base composition and (B) carbon fiber component.

The third aspect of the present invention relates to a cured organosilicon rubber obtained by curing the curable organosilicon composition as described above.

The forth aspect of the present invention relates to a use of the cured organosilicon rubber, especially as an electrically conducting element in fields of electronics, automobiles, aerospace, high-speed railway, communication, electric power, medicine and wearable intelligent devices.

(A) Polysiloxane Base Composition

The polysiloxane base composition constitutes the matrix of organosilicon rubber. In the present invention, the polysiloxane base composition is not specially restricted as long as it can be cured to form the corresponding silicon rubber material. According to curing mechanism, the polysiloxane base composition can be addition curable, condensation polymerization curable or organic peroxide curable.

In a specific embodiment, the polysiloxane base composition can be addition curable, that is, it can be cured for example by crosslinking alkenyl-containing polysiloxane and hydrogen-containing polysiloxane in the presence of a platinum group metal catalyst.

An exemplary addition-curable polysiloxane base composition comprises:

(a1) at least one polysiloxane containing per molecule at least two alkenyl groups bonded to silicon atom, (b1) at least one hydrogen-containing polysiloxane having per molecule at least one hydrogen atom bonded to the same or different silicon atom, with the proviso that this component has in total at least two hydrogen atoms bonded to the same or different silicon atom, and (c1) at least one platinum group metal catalyst.

With regard to (a1) alkenyl-containing polysiloxane, the alkenyl groups can be at any position of the main chain of polysiloxane, for example, at ends or in the middle of the molecular chain or both.

Preferably, the alkenyl-containing polysiloxane (a1) comprises:

(i) at least two siloxy units of Formula (I-1), $$R^1_a Z_b SiO_{[4-(a+b)]/2} \quad \text{(I-1)}$$

wherein $R^1$ represents $C_{2-12}$, preferably $C_{2-6}$ alkenyl group, most preferably vinyl or allyl, Z represents identically or differently a univalent hydrocarbyl group with 1 to 30, preferably 1 to 12 carbon atoms, preferably selected from $C_{1-8}$ alkyl groups including alkyl groups optionally substituted with at least one halogen atom, and from aryl groups, especially $C_{6-20}$ aryl groups, a is 1 or 2, b is 0, 1 or 2, and the sum of a and b is 1, 2 or 3, and optionally (ii) other siloxy units of Formula (I-2)

$$Z_c SiO_{\frac{4-c}{2}} \quad \text{(I-2)}$$

wherein

Z has the meanings as indicated above and c is 0, 1, 2 or 3.

In a preferred embodiment, Z can be selected from methyl, ethyl, propyl, 3,3,3-trifluoropropyl, phenyl, xylyl and tolyl and the like. Preferably, at least 60 mol % (or expressed by number) of group Z is methyl.

The alkenyl-containing polysiloxane (a1) can have a viscosity of at least 50 mPa·s and preferably less than 2,000,000 mPa·s. It can also be a gel with greater viscosity. In the present application, all viscosities relate to dynamic viscosities values and can be measured for example in a known manner using a Brookfield viscometer at 20 □. If the viscosity is too high to be measured by Brookfield instrument, it can be measured by needle penetration method.

The alkenyl-containing polysiloxane (a1) may be formed only units of Formula (I-1), or contain additionally units of Formula (I-2). The alkenyl-containing polysiloxane (a1) can be linear, branched or cyclic. Without impairing the purpose of the present invention, the molecular chain may further contain branched siloxy units, but in the proportion preferably not exceeding 10%, more preferably not exceeding 5% in the alkenyl-containing polysiloxane (a1).

Examples of the siloxy unit of Formula (I-1) are vinyl dimethyl siloxy, vinyl phenyl methyl siloxy, vinyl methyl siloxy and vinyl siloxy unit.

Examples of the siloxy unit of Formula (I-2) are $SiO_{4/2}$ unit, dimethyl siloxy, methyl phenyl siloxy, diphenyl siloxy, methyl siloxy and phenyl siloxy.

Examples of the alkenyl-containing polysiloxane comprise linear or cyclic compound, are for example, dimethyl polysiloxane having dimethyl vinyl siloxy end group, (methyl vinyl)(dimethyl)polysiloxane copolymer having trimethyl siloxy end group, (methyl vinyl)(dimethyl)polysiloxane copolymer having dimethyl vinyl siloxy end group and cyclic methyl vinyl polysiloxane.

In the polysiloxane base composition of the present invention, the hydrogen-containing polysiloxane component (b1) must have at least two hydrogen atoms bonded to the same or different silicon atom(s) so as to perform crosslinking reaction with the alkenyl-containing polysiloxane of component (a1). Hence, as the hydrogen-containing polysiloxane component (b1), at least one hydrogen-containing polysiloxane having per molecule at least two hydrogen atoms bonded to the same or different silicon atom(s), or a mixture of at least two hydrogen-containing polysiloxanes having per molecule at least two hydrogen atom bonded to the same or different silicon atom can be used.

In the component (b1) or hydrogen-containing polysiloxane or mixture of hydrogen-containing polysiloxanes according to the present invention, the SiH group can be at any position of the main chain of polysiloxane, for example, at ends or in the middle of the molecular chain or both.

The hydrogen-containing polysiloxane having SiH group is able to crosslink with the component (a1), i.e., forming a cured product by reacting the SiH group of this component with the alkenyl group of the component (a1). Preferably, as component (b1), at least one hydrogen-containing polysiloxane having two, three or more SiH groups per molecule is employed.

In a preferred embodiment, the hydrogen-containing polysiloxane comprises:

(i) at least two siloxy units of Formula (I-3):

$$H_dR^2_eSiO_{[4-(d+e)]/2} \quad (I-3)$$

wherein $R^2$ represents identically or differently a univalent hydrocarbyl, preferably selected from $C_{1-8}$ alkyl groups including alkyl groups optionally substituted with at least one halogen atom, and from aryl groups, especially $C_{6-20}$ aryl groups, d is 1 or 2, e is 0, 1 or 2, and the sum of d and e is 1, 2 or 3, and optionally (ii) at least one other unit of Formula (I-4)

$$R^2_fSiO_{(4-f)/2} \quad (I-4)$$

wherein $R^2$ has the meanings as indicated above and f is 0, 1, 2 or 3.

In a more preferred embodiment, $R^2$ can be selected from methyl, ethyl, propyl, 3,3,3-trifluoropropyl, phenyl, xylyl and tolyl.

The component (b1) or hydrogen-containing polysiloxane or mixture thereof has a dynamic viscosity of at least 1 mPa·s, preferably from 3 to 1000 mPa·s, and more preferably 5-100 mPa·s.

The hydrogen-containing polysiloxane can be formed only from units of Formula (I-3) or contain additionally units of Formula (I-4). The hydrogen-containing polysiloxane can be of linear, branched or cyclic structure. Without impairing the purpose of the present invention, the molecular chain can further contain branched siloxy units, but in the proportion preferably not exceeding 10%, more preferably not exceeding 5% in the hydrogen-containing polysiloxane component.

Examples of the unit of Formula (II-1) are $H(CH_3)_2SiO_{1/2}$, $HCH_3SiO_{2/2}$ and $H(C_6H_5)SiO_{2/2}$.

Examples of the unit of Formula (II-2) can be the same as those examples given above for the unit of Formula (I-2).

The feasible examples of the hydrogen-containing polysiloxane include linear or cyclic compounds, for example, dimethyl polysiloxane having hydrogenated dimethyl siloxy end group, copolymer having (dimethyl)(hydrogenmethyl) polysiloxane units having trimethyl siloxy end group, copolymer having (dimethyl)(hydrogenmethyl) polysiloxane units having hydrogenated dimethyl siloxy end group, hydrogenated methyl polysiloxane having trimethylsiloxy end group, and cyclic hydrogenated methyl polysiloxane.

In an embodiment, the hydrogen-containing polysiloxane can be a mixture of a dimethyl polysiloxane comprising hydrogenated dimethylsilyl end group and an organopolysiloxane comprising at least three hydrogenated silyl groups.

The platinum group metal catalyst can be composed of at least one platinum group metal or compound. Its amount should be sufficient to promote the addition reaction of vinyl of the component (a1) with SiH of the component (b1) and curing thereby. In an advantageous embodiment, the amount of the catalyst can be, expressed by metal weight, in a range from 0.1-1,000 ppm, preferably 1-50 ppm.

The platinum metal catalyst is well known in organosilicon field and commercially available. In addition to platinum, the platinum group metal can further comprise ruthenium, rhodium, palladium, osmium and iridium. The catalyst can be composed of following components: a platinum group metal or compound thereof or a combination thereof. Examples of such a catalyst include but not limited to: platinum black, chloroplatinic acid, platinum dichloride, reaction product of chloroplatinic acid with monohydric alcohol. Preferably, compounds of platinum and rhodium are used. Usually, the preferred catalyst is platinum.

Some suitable complexes and compounds of platinum are disclosed in, for example, U.S. Pat. Nos. 3,159,601A, 3,159,602A, 3,220,972A, EP0057459A, EP0188978A and EP0190530A, and especially a complex of platinum and vinyl organosiloxane as disclosed in, for example, U.S. Pat. Nos. 3,419,593A, 3,715,334A, 3,377,432A and 3,814,730A can be used. All these documents are incorporated in its entirety in the present specification by reference.

In addition to the components (a1) to (c1) mentioned above, the polysiloxane base composition may further comprise a polymerization inhibitor.

The inhibitors commonly used for addition-type polysiloxane system can be alkynol-type inhibitors or vinyl-type inhibitors, or a mixture of these two kinds of inhibitors in a certain ratio. These inhibitors are disclosed in for example the following patents: EP0794217A1, US20140004359, CN102277128A, CN103554924A and CN103655212A. Here, the full texts of these patents are incorporated in the present specification by reference.

Examples of vinyl-type inhibitors are tetramethyl divinyl silane, polyvinyl silicon oil, tetramethyl tetravinyl cyclotetrasiloxane.

Examples of alkynol-type inhibitor are 3-butyn-2-ol, 1-pentyn-3-ol, 1-hexyn-3-ol, 1-heptyn-3-ol, 5-methyl-1-hexyn-3-ol, 3,5-dimethyl-1-hexyn-3-ol, 1-ethynyl-1-cyclopentanol, 1-ethynyl-1-cyclohexanol, 1-ethynyl-1-cycloheptanol, 3-ethyl-1-hexyn-3-ol, 3-ethyl-1-heptyn-3-ol, 3-isobutyl-5-methyl-1-hexyn-3-ol, 3,4,4-trimethyl-1-pentyn-3-ol, 3-ethyl-5-methyl-1-heptyn-3-ol, 4-ethyl-1-octyn-3-ol, 3,7,11-trimethyl-1-dodecyn-3-ol, 1-ethynyl-1-cyclooctanol, 3-methyl-1-butyn-3-ol, 3-methyl-1-pentyn-3-ol, 3-methyl-1-hexyn-3-ol, 3-methyl-1-heptyn-3-ol, 3-methyl-1-octyn-3-ol, 3-methyl-1-nonyl-3-ol, 3-methyl-1-decyn-3-ol, 3-methyl-1-dodecyn-3-ol, 3-ethyl-1-pentyn-3-ol, 2,4,7,9-tetramethyl-5-decyn-4,7-diol. In view of the purpose of the present invention, 2,4,7,9-tetramethyl-5-decyn-4,7-diol is preferred.

As for the addition curable polysiloxane base composition, these inhibitors may have not to added, if it has already met the requirements on manufacture, transportation and storage in case of no inhibitors.

The amounts of the components (a1) and (b1) depend on the molar ratio of SiH groups to alkenyl groups. In an advantageous embodiment, the components (a1) and (b1) of the polysiloxane base composition are used in such amounts that the molar ratio of SiH groups to alkenyl groups is in range of 0.5-5, preferably 0.8-4, and more preferably 1-3.

In another specific embodiment, the polysiloxane base composition can be condensation polymerization curable. That means a reactive polysiloxane having condensable or hydrolysable groups or hydroxy groups can be cured with an optional curing agent in the presence of an optional condensation catalyst.

An exemplary condensation polymerization curable polysiloxane base composition comprises:

(a2) at least one reactive linear polysiloxane having at each chain end at least two condensable groups or hydrolysable groups other than OH, or having only hydroxy groups, (b2) optionally at least one non-reactive linear polysiloxane without condensable or hydrolysable groups or hydroxy groups, (c2) optionally at least one crosslinking agent.

In the reactive linear polysiloxane having at each chain end at least two condensable groups or hydrolysable groups other than OH or having only hydroxy groups, the condensable groups include amino, amido, amino-oxy, ketimineoxy, imino-oxy, enoxy, alkoxy, alkoxy-enoxy, acyloxy and phosphate groups, and the condensable groups include hydrogen atom and halogen atom, which can be located at any position of the main chain of polysiloxane, i.e., at two ends or in the middle or both.

In a specific embodiment, the reactive linear polysiloxane can be of the following formula:

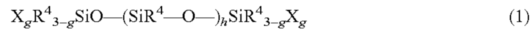

$$X_gR^4_{3-g}SiO—(SiR^4—O—)_hSiR^4_{3-g}X_g \quad (1)$$

wherein, $R^4$ is identical or different and independently of each other represents substituted or non-substituted hydrocarbyl, preferably univalent hydrocarbyl having 1 to 30, preferably 1 to 12 carbon atoms, more preferably selected from $C_{1-8}$ alkyl or aryl, such as methyl, ethyl, propyl, butyl, hexyl and octyl as well as phenyl. Group $R^4$ can be optionally substituted with for example halogen or cyano group. As examples of substituted $R^4$, 3,3,3-trifluoropropyl, chlorophenyl and β-cyanoethyl can be mentioned.

X represents identically or differently hydrolysable or condensable group (other than OH) or hydroxy group.

h has a value sufficient to make the reactive linear polysiloxane have a dynamic viscosity at 25° C. of 1000 to 2000000 mPa·s, preferably 5000 to 80000 mPa·s. For example, h is an integer of 30-3000.

g is 1, 2 or 3. When X represents hydroxy, g is equal to 1.

As examples of unit $SiR^4O$, $(CH_3)_2SiO$, $CH_3(C_6H_5)SiO$, $(C_6H_5)_2SiO$, $CF_3CH_2CH_2(CH_3)SiO$, $NC—CH_2CH_2(CH_3)SiO$ can be listed.

Group X can be preferably selected from the following hydrolysable or condensable groups: n-butyl amino, sec-butyl amino and cyclohexyl amino, benzoyl amino, dimethyl aminooxy, diethyl aminooxy, dioctyl aminooxy, diphenyl aminooxy, imino oxy and ketimineoxy derived from acetophenone oxime, acetone oxime, benzophenone oxime, methylethylketone oxime, diisopropylketone oxime and chlorocyclohexanone oxime, alkoxy having 1 to 8 carbon atoms such as methoxy, propoxy, isopropoxy, butoxy, hexyloxy and octyloxy, methoxy-vinyloxy, acyloxy having 1 to 8 carbon atoms such as formyloxy, acetoxy, propionyloxy and 2-ethylhexanoyloxy, phosphate groups derived from dimethyl phosphate, diethyl phosphate and dibutyl phosphate, and halogen such as chlorine.

Most preferably, group X is selected from hydroxy group or alkoxy group having 1 to 8 carbon atoms such as methoxy, propoxy, isopropoxy, butoxy, hexyloxy and octiloxy.

The preferable reactive linear polysiloxane is α,ω-dihydroxylated di-organopolysiloxane of Formula (1), wherein X═OH and g=1, and h has a value sufficient to make the reactive linear polysiloxane have a dynamic viscosity at 25° C. of 1000 to 2000000 mPa·s, preferably of 5000 to 80000 mPa·s.

With regard to the non-reactive linear polysiloxane without condensable or hydrolysable groups or hydroxy group, a silicon oil of Formula (2) can be used:

$$R^4_3SiO—(SiR^4—O—)_{h'}SiR^4_3 \quad (2)$$

wherein $R^4$ can be identical or different and have the definition given in Formula (1), and h' has a value sufficient to make the non-reactive polysiloxane have a dynamic viscosity at 25° C. of 10 to 10000 mPa·s, preferably 30 to 2000 mPa·s.

It should be understood that within the scope of the present invention, the useful hydroxylated reactive polysiloxane of Formula (1) can be a mixture comprising several hydroxylated polymers which are different from each other in view of viscosity values and/or nature of the substituents linked to silicon atoms. It should be further understood that the hydroxylated polymer of Formula (1) can comprise, in addition to D unit of formula $SiR_2O$, further optionally units of $SiR_{3/2}$ and/or $SiR_{4/2}$ in a proportion of up to 10% (in relation to number of T units and/or Q units per 100 silicon atoms). The same explanation can also be used for the non-reactive polysiloxane of Formula (2).

In addition, the condensation polymerization curable polysiloxane base composition may further optionally comprise one or more silanes of the following formula or partially hydrolyzed product thereof as crosslinking agent (c2):

$$R^4_{4-z}SiX_z \quad (3)$$

wherein group $R^4$ and X are as defined in Formula (1), and index z represents 3 or 4.

In case that the reactive polysiloxane is α,ω-dihydroxylated di-organo polysiloxane, the crosslinking agent is necessary, while in case that the reactive polysiloxane has at each chain end condensable groups or hydrolysable groups, the crosslinking agent may be not needed.

In one embodiment, the crosslinking agent is for example vinyl trimethoxy silane, vinyl triethoxy silane, 3-(glycidyloxy) propyl ethoxy silane.

In addition, the condensation polymerization curable polysiloxane base composition may further optionally comprise at least one condensation catalyst (d2).

The condensation catalyst (d2) can be selected from organotin or organotitanium compounds, for example, stannous octoate, dibutyltin, dibutyltin diacetate, dibutyltin dilaurate, dibutyltin di(2-ethylhexanoate), dibutyltin diisooctylmaleate, stannous neodecanoate, n-butyl titanate, isopropyl titanate, isobutyl titanate, 1,3-propanedioxytitanium bis(ethyl acetoacetate).

Other condensation catalysts can be used as guanidine compounds disclosed for example in WO2009/118307 and WO2010/060877 patent applicatios or Zn compounds disclosed for example in WO 2009/106718, WO2014/096566 and WO2014/096567 patent applicatins.

In a further specific embodiment, the polysiloxane base composition can be peroxide curable.

An exemplary useful peroxide curable polysiloxane base composition comprises:

(a3) at least one organopolysiloxane polymer, comprising 0-4 wt %, preferably 0.01-3 wt %, of alkenyl groups, and (b3) at least one organic peroxide.

These organopolysiloxane polymers can be an oil (e.g. having a viscosity of 50000-1000000 mPa·s at 25° C.) or a gel (e.g. having a viscosity higher than 1000000 mPa·s), or a mixture of oil and gel. They can be commercially available or prepared according to the methods known in the art.

The organopolysiloxane polymers can be a linear diorganopolysiloxane, of which the main chain is mainly composed of $R^5_2$ SiO units. This chain at each end is terminated with $R^5_3$ $Si_{0.5}$ unit and/or $OR^6$ group.

In the above formula, group $R^5$ represents identically or differently $C_1$-$C_{18}$, preferably $C_1$-$C_{12}$ hydrocarbyl or halogenated hydrocarbyl. The hydrocarbyl includes alkyl, alkenyl, aryl, arylalkyl, alkylaryl, cycloalkyl, cycloalkenyl, cyanoalkyl. Preferably, group $R^5$ represents methyl, ethyl, propyl, octyl, octadecyl, phenyl, tolyl, xylyl, benzyl, phenylethyl, cyclohexyl, cycloheptyl, cyclohexenyl, vinyl, allyl, cyanoethyl, chloromethyl, 3,3,3-trifluoropropyl, chlorophenyl, dibromophenyl, trifluoromethyl phenyl.

Group $R^6$ represents hydrogen atom, $C_1$-$C_4$ alkyl or β-methoxyethyl.

Preferably, at least 60% of groups $R^5$ represent methyl. However, along the diorganopolysiloxane chain, there may be also a small amount of units different from $R^5{}_2$ SiO, for example, $R^5Si_{1.5}$ units and/or $SiO_2$ units in a proportion up to 2% (% values represent number of T and/or Q units per 100 silicon atoms).

Examples of the above mentioned units $R^5SiO$, $R^5{}_3$ $SiO_{0.5}$ and groups of formula $OR^6$ include $(CH_3)_2SiO$, $CH_3(CH_2{=}CH)SiO$, $CH_3(C_6H_5)SiO$, $(C_6H_5)_2SiO$, $CH_3(C_2H_5)SiO$, $(CH_3CH_2CH_2)CH_3SiO$, $CH_3(n\text{-}C_3H_7)SiO$, $(CH_3)_3SiO_{0.5}$, $(CH_3)_2(CH_2{=}CH)SiO_{0.5}$, $CH_3(C_6H_5)SiO_{0.5}$, $CH_3(C_6H_5)(CH_2{=}CH)SiO_{0.5}$, OH, $—OCH_3$, $—OC_2H_5$, $—O\text{-}n\text{-}C_3H_7$, $—O\text{-}n\text{-}C_4H_9$ and $—OCH_2CH_2OCH_3$.

The organic peroxide component (b3) used in this embodiment is not specifically limited, as long as it can decompose to generate free oxygen radical. It can be used in pure state, or in the form of being dissolved in an organic solvent or silicon oil. The organic peroxide component consists of at least one peroxide selected from for example di-tert-butyl peroxide, 2,5-dimethyl-2,5-di-tert-butyl peroxyhexane, benzoyl peroxide, 2,4-dichlorobenzoyl peroxide, monochlorobenzoyl peroxide, tert-butyl peracetate, dicumyl peroxide, and 2,5-dimethyl hexane-2,5-diperbenzoate.

The amount of the organic peroxide component is 0.05-15 weight parts, preferably 0.2-8 weight parts relative to 100 weight parts of the component (a3).

(B) Carbon Fiber Component

The curable organosilicon composition according to the present invention further comprises a carbon fiber component. The carbon fiber component is composed of one or more different carbon fibers.

Within the scope of the present invention, "carbon fiber" refers to a fiber material with high strength and high modulus and usually having a carbon content of 90% or more. For example, it may be formed by stacking fibers such as flaky graphite microcrystals in the axial direction of the fiber, and it may be a microcrystalline graphite material obtained via carbonization and graphitization. It can be a commercially available product. Within the scope of the present invention, the carbon fiber has an aspect ratio of greater than 1:1, usually 5:1, advantageously 10:1 or 20:1 or higher.

The carbon fiber component comprises carbon fiber with average length of 10 μm to 5000 μm, preferably 30-3500 μm, more preferably 60-3000 μm, in an amount of 2 to 300%, preferably 5 to 250%, more preferably 15 to 150%, based on the weight of (A) polysiloxane base composition, with the provisos that: (1) if the carbon fiber component comprises exclusively carbon fiber with average length of not greater than 200 μm, its content is greater than 25%, preferably greater than 30%; and (2) if the carbon fiber component comprises exclusively carbon fiber with average length of greater than 2800 μm, its content is not greater than 40%, preferably not greater than 30%, more preferably not greater than 15%.

Advantageously, the carbon fiber component comprises, based on the weight of (A) polysiloxane base composition, 10 to 150% of a carbon fiber with average length of 10 to 2500 μm.

Under the premise that a relatively high electric conductivity is ensured, if using carbon fibers with a relatively small average length, higher amount is needed. In addition, if using carbon fibers with a relatively large length, a relatively high electric conductivity could be achieved at a relatively low amount. However, if using excessive such relatively long carbon fibers, the processability and mechanical properties may be deteriorated. Hence, excellent electrical conductivity and regulable mechanical performance could be achieved by combining long and short fibers in the economic addition amount of carbon fibers. With the suitable processing technologies and in order to meet some specific application requirements, according to the present invention, the carbon fibers of uniform length can be used alone or alternatively the combination of two types of carbon fibers with different average lengths can be used. Hence, it must be required in the present invention to comprise 2 to 300% of a carbon fiber with average length of 10 to 5000 μm, in particular with provisos that: (1) if the carbon fiber component comprises exclusively carbon fibers with average length of not greater than 200 μm, its content must be greater than 25%; and (2) if the carbon fiber component comprises exclusively carbon fibers with average length of greater than 2800 μm, its content is not greater than 40%. Otherwise, it will be difficult to obtain an organosilicon composition with regulable conductivity and mechanical properties after curing.

In a more preferable embodiment, in case the carbon fiber component comprises exclusively carbon fibers with average length of not greater than 300 μm, its content is greater than 25%, preferably greater than 35%.

In another preferable embodiment, the carbon fiber component comprises at least one carbon fiber with average length of 10 μm-600 μm and at least one carbon fiber with average length of >600 μm-5000 μm, preferably >800 μm-3500 μm and more preferably >800 μm-2500 μm.

In addition, advantageously, the weight ratio of carbon fiber with average length of 10 μm-600 μm and the carbon fiber with average length of >600 μm-5000 μm, preferably >800 μm-3500 μm and more preferably >800 μm-2500 μm is 2/1-100/1, preferably 3/1-50/1, more preferably 3/1-20/1 and even more preferably 10/1-15/1.

Preferably, if using carbon fibers with two different average lengths in combination as the carbon fiber component, the length difference between the carbon fiber with average length of 10 μm-600 μm and the carbon fiber with average length of >600 μm-5000 μm, preferably >800 μm-3500 μm and more preferably >800 μm-2500 μm is in range of 100-4000 μm, preferably 150-3000 μm, more preferably 300-2500 μm and even more preferably 500-2000 μm.

The electrically-conductive curable organosilicon composition of the present invention can further comprise one or more additives selected from antistatic agent, radiation shielding agent, free radical inhibitor, adhesive modifier, flame retardant additive, surfactant, storage stability modifier, ozone degradation inhibitor, light stabilizer, viscosity builder, plasticizer, thixotropic agent, antioxidant and heat stabilizer. In the meantime, other polyorganosiloxanes, siloxane resins, polyorganosilsesquioxanes and silicon rubber powders can also be used.

Other than the carbon fiber component, the electrically-conductive curable organosilicon composition of the present invention may comprise further fillers, such as precipitated silica, fumed silica, diatomite, and also alumina, iron oxide, zinc oxide, titanium oxide, cerium oxide, aluminum powder, iron powder, nickel powder, copper powder, silver powder, gold powder, graphite, carbon black, carbon nanotubes, graphenes, etc.

The above-listed optional additives and other fillers may be added provided that the addition amount would not deteriorate the polysiloxane base composition in curing speed, electrical conductivity, mechanical properties, etc. Usually, the amount of these optional additives described above is not greater than 150%, preferably not greater than 100%, more preferably not greater than 50%, further more preferably not greater than 30%, especially preferably not greater than 20%, based on the weight of (A) polysiloxane base composition. It is also feasible that these optional additives are not added.

In a preferred embodiment, the curable organosilicon composition according to the present invention comprises further fillers other than carbon fibers such as metal powder fillers in an amount of not greater than 150%, preferably not greater than 100%, more preferably not greater than 50%, especially preferably not greater than 20%, based on the weight of (A) polysiloxane base composition. In an advantageous embodiment, the filler consists merely of the carbon fiber component according to the present invention.

aerospace, high-speed railway, communication, electric power, medicine and wearable intelligent devices.

EXAMPLES

The present invention is further illustrated in conjugation with the following examples. However, the present invention is not limited to the following examples. In addition, the percentage, share and ratio data in the specification of the present application are all expressed in weight, unless clearly stated otherwise.

The raw materials used:

| | Composition or properties | Source |
|---|---|---|
| 621V1500 | Polysiloxane with vinyl double-bonds at two ends of main chain, viscosity: 1500 mPa•s | Bluestar Silicones Co. Ltd. |
| 51BASE LSR | Mixture of 621V1500 and silica | Bluestar Silicones Co. Ltd. |
| 620H2 | CAS: 70900-21-9, hydrogen-containing polysiloxane with SiH at two ends of main chain, viscosity: 8 mPa•s | Bluestar Silicones Co. Ltd. |
| 626V25H7 | CAS: 69013-23-6, hydrogen-containing polysiloxane with SiH at two ends and in the middle of main chain, viscosity: 25 mPa•s | Bluestar Silicones Co. Ltd. |
| 626V30H2.5 | Hydrogen-containing polysiloxane with SiH at two ends and in the middle of main chain, viscosity: 30 mPa•s | Bluestar Silicones Co. Ltd. |
| TMDDO | 2,4,7,9-tetramethy1-5-decyn-4,7-diol CAS: 1604-35-9 | BASF AG |
| PE400 ML | Polyethylene glycol monolaurate, CAS: 9004-81-3 | Eigenmann & Veronelli |
| Pt catalyst | Platinum(0)-divinyl tetramethyl disiloxane complex, CAS: 68478-92-2 | Shanghai Heraeus Industrial Technology Materials, Co., Ltd. |
| EMPATAGE 1334 | Mixture of polydimethylsiloxane and silica, viscosity: 100000 mPa•s | Bluestar Silicones Co. Ltd. |
| HUILE 48V14000 | CAS: 70131-67-8, dihydroxy-terminated polydimethylsiloxane, viscosity: 14000 mpa•s | Bluestar Silicones Co. Ltd. |
| RP 120 PA | CAS: 70131-67-8, polysiloxane with hydroxy groups at two ends of main chain, viscosity: 45 mPa•s | Bluestar Silicones Co. Ltd. |
| SILANE 51005 | CAS: 68412-37-3, tetraethyl ester of silicic acid ($H_4SiO_4$), | Bluestar Silicones Co. Ltd. |
| DABCO T-12 | CAS: 77-58-7, dibutyltin dilaurate | Air Products Changzhou Co., Ltd. |
| Carbon fiber CF1 | Diameter: about 7 μm; Length: 70 μm | Toho Tenax Inc. |
| Carbon fiber CF2 | Diameter: about 7 μm; Length: 100-150 μm | Toho Tenax Inc. |
| Carbon fiber CF3 | Diameter: about 7 μm; Length: 300 μm | Toho Tenax Inc. |
| Carbon fiber CF4 | Diameter: about 7 μm; Length: 500 μm | Toho Tenax Inc. |
| Carbon fiber CF5 | Diameter: about 7 μm; Length: 2000 μm | Toray Industries Inc. |
| Carbon fiber CF6 | Diameter: about 7 μm; Length: 3000 μm | |

The second aspect of the present invention relates to a method for preparing the curable organosilicon composition as described above, which comprises uniformly mixing (A) polysiloxane base composition and (B) carbon fiber component. The uniformly mixing can be achieved by the mixing equipment such as planetary stirrer, kneader, extruder, etc., simultaneously accompanying the heat treatment depending on the actual requirements. Then, curable organosilicon composition can be prepared by gluing, dispensing, coating, screen printing, tableting, molding, extruding and so on.

The third aspect of the present invention relates to a cured organosilicon rubber obtained by curing the curable organosilicon composition as described above. The curing conditions are not specifically limited, preferably keeping at 60-200° C. for 3-200 minutes. Secondary vulcanization can be optionally carried out after molding, preferably at 120-250° C. for 1-24 hours.

Advantageously, the cured organosilicon rubber has a volume resistivity of 0.01 to 100000 Ω·cm.

The fourth aspect of the present invention relates to a use of the cured organosilicon rubber, especially as electrically-conductive elements in fields of electronics, automobiles, Evaluation of Properties According to the present invention, after the electrically-conductive silicon rubbers were prepared, each product was evaluated by the following methods and the results were shown in Table 2.

Volume resistivity: measured according to GB/T 2439-2001, equivalent to ISO1853: 1998. Test specimen had length of 10 cm, thickness of 2-3 mm and width of 1 cm.

Tensile strength and elongation at break: tensile strength was measured according to ASTM D412. Curing condition: at 150□, for 90 minutes.

Tear strength: tear strength was measured according to ASTM D412. Curing condition: at 150□, for 90 minutes.

Hardness: hardness was measured according to ASTM D2240. Curing condition: at 150□, for 90 minutes.

Rebound resilience: rebound resilience of the electrically-conductive silicon rubber was measured according to ISO4662. Curing condition: at 150□, for 90 minutes.

Density: density of the electrically-conductive silicon rubber was measured according to ISOR1183. Curing condition: at 150□, for 90 minutes.

Example 1 (Ex1)

As shown in Table 1, 0.07 weight parts of hydrosilylation inhibitor TMDDO was added to a mixture of 55.6 weight parts of 621V1500 and 44.4 weight parts of 51BASE LSR and mixed, and then 0.84 weight parts of hydrogen-containing polysiloxane 620H2, 0.93 weight parts of hydrogen-containing polysiloxane 626V25H7, and 0.88 weight parts of hydrogen-containing polysiloxane 626V30H2.5 were added. After further mixing uniformly, 5 weight parts of carbon fiber CF5 with length of 2000 μm and 63 weight parts of carbon fiber CF4 with length of 500 μm were added in batches, and stirred thoroughly by a planetary mixer. Then, 1 weight part of thixotropic agent PE400ML was added, and stirred thoroughly under vacuum. Finally, 100 ppm of platinum catalyst was added and mixed thoroughly. Curing at 150□ for 90 minutes. Thus, the cured electrically-conductive organosilicon rubber was obtained.

Examples 2-8 (Ex2-Ex8)

Examples 2-8 were performed similar to Example 1, except that different amounts of raw materials and preparation conditions as shown in Table 1 were used.

Example 9 (Ex9)

As shown in Table 2, 0.61 weight parts of RP 120 PA was added to a mixture of 60 weight parts of EMPATAGE 1334 and 35 weight parts of HUILE 48V14000. After being mixed thoroughly, 5.1 weight parts of carbon fiber CF5 with length of 2000 μm and 30 weight parts of carbon fiber CF4 with length of 500 μm were added in batches, and stirred thoroughly by a planetary mixer. Then, 0.27 weight parts of desalted water was added, and stirred thoroughly under vacuum. Then, 1 weight part of thixotropic agent PE400ML was added, stirred thoroughly under vacuum. Finally, 2.3 weight parts of SILANE 51005 and 0.33 weight parts of DABCO T-12 were added, and mixed thoroughly. After being cured at 1500 for 90 minutes, an electrically-conductive silicon rubber composition was obtained.

Comparative Examples 1-4 (C1-C4)

Comparative Examples 1-4 were performed similar to Example 1, except that different amounts of raw materials and preparation conditions as shown in Table 1 were used.

According to the above measurement methods, the properties of the cured electrically-conductive silicon rubbers obtained in Examples 1-9 and Comparative Examples 1-4 were evaluated, and the results were shown in Table 3. It can be seen from the data in the table that the cured electrically-conductive silicon rubbers of Comparative Examples 1-4 could hardly meet requirements of the present invention, even requirements of practical applications, especially in terms of conductivity and mechanical properties and processability.

TABLE 1

| | Ex1 | Ex2 | Ex3 | Ex4 | Ex5 | Ex6 | Ex7 | Ex8 | C1 | C2 | C3 | C4 |
|---|---|---|---|---|---|---|---|---|---|---|---|---|
| 621V1500 | 55.6 | 55.6 | 55.6 | 55.6 | 55.6 | 55.6 | 55.6 | 55.6 | 55.6 | 55.6 | 55.6 | 55.6 |
| 51BASE LSR | 44.4 | 44.4 | 44.4 | 44.4 | 44.4 | 44.4 | 44.4 | 44.4 | 44.4 | 44.4 | 44.4 | 44.4 |
| 620H2 | 0.84 | 1.5 | 1.5 | 0 | 1.5 | 1.5 | 1.5 | 1.5 | 1.5 | 1.5 | 1.5 | 1.5 |
| 626V25H7 | 0.93 | 1.8 | 1.8 | 0 | 1.8 | 1.8 | 1.8 | 1.8 | 1.8 | 1.8 | 1.8 | 1.8 |
| 626V30H2.5 | 0.88 | 1.6 | 1.6 | 7.6 | 1.6 | 1.6 | 1.6 | 1.6 | 1.6 | 1.6 | 1.6 | 1.6 |
| TMDDO | 0.07 | 0.05 | 0.05 | 0.07 | 0.05 | 0.05 | 0.05 | 0.08 | 0.05 | 0.05 | 0.06 | 0.06 |
| PE400 ML | 1 | 1 | 1 | 1 | 1 | 1 | 1 | 1 | 1 | 1 | 1 | 1 |
| Pt catalyst | 0.01 | 0.01 | 0.01 | 0.01 | 0.01 | 0.01 | 0.01 | 0.01 | 0.01 | 0.01 | 0.01 | 0.01 |
| Carbon fiber CF1 | 0 | 0 | 0 | 0 | 0 | 0 | 26.5 | 0 | 20 | 0 | 0 | 0 |
| Carbon fiber CF2 | 0 | 0 | 52 | 0 | 0 | 0 | 0 | 0 | 0 | 0 | 0 | 0 |
| Carbon fiber CF3 | 0 | 0 | 0 | 0 | 0 | 26.5 | 0 | 0 | 0 | 0 | 0 | 0 |
| Carbon fiber CF4 | 63 | 0 | 0 | 67 | 25 | 0 | 0 | 107 | 0 | 0 | 318 | 0 |
| Carbon fiber CF5 | 5 | 15 | 0 | 5.4 | 2 | 0 | 2.1 | 0 | 0 | 1 | 0 | 0 |
| Carbon fiber CF6 | 0 | 0 | 0 | 0 | 0 | 0 | 0 | 0 | 0 | 0 | 0 | 48 |

TABLE 2

| | Ex9 |
|---|---|
| EMPATAGE 1334 | 60 |
| HUILE 48V14000 | 35 |
| RP 120 PA | 0.61 |
| Desalted water | 0.27 |
| SILANE 51005 | 2.3 |
| DABCO T-12 | 0.33 |
| PE400 ML | 1 |
| Carbon fiber CF4 | 30 |
| Carbon fiber CFS | 5.1 |

TABLE 3

| | Ex1 | Ex2 | Ex3 | Ex4 | Ex5 | Ex6 | Ex7 | Ex8 | Ex9 | C1 | C2 | C3 | C4 |
|---|---|---|---|---|---|---|---|---|---|---|---|---|---|
| Hardness/ Shore.A | 56 | 53 | 62 | 77 | 53 | 50 | 45 | 40 | 59 | — | — | Difficult to process | |
| Tensile strength/ Mpa | 1.4 | 0.9 | 1.34 | 1.68 | 1.1 | 2 | 1.5 | 0.6 | 1.67 | — | — | | |
| Elongation at break/% | 123 | 48 | 192 | 20 | 170 | 223 | 190 | 60 | 174 | — | — | | |
| Tear strength/ N/mm | 9.6 | 8.83 | 10 | 17.71 | 7.12 | 6.8 | 6.7 | 7.8 | 15.2 | — | — | | |
| Density/ $g/cm^3$ | 1.18 | 1.07 | 1.18 | 1.15 | 1.1 | 1.1 | 1.15 | — | 1.17 | — | — | | |
| Volume resistivity/ Ω · cm | 0.4 | 0.22 | 4.6 | 1.3 | 2.8 | 85 | 21 | 1.5 | 12 | $>10^{10}$ | $>10^{10}$ | | |

What is claimed is:

1. A curable organosilicon composition, which comprises:

(A) a polysiloxane base composition, and (B) a carbon fiber component;

wherein the carbon fiber component comprises, based on the weight of (A) polysiloxane base composition, 2 to 300% of a carbon fiber with average length of 10 μm to 5000 μm, wherein the carbon fiber component comprises at least one carbon fiber with average length of 10 μm-600 μm and at least one carbon fiber with average length of >600 μm-5000 μm, and wherein the weight ratio of the carbon fiber with average length of 10 μm-600 μm to the carbon fiber with average length of >600 μm-5000 μm is 2/1-100/1.

2. The curable organosilicon composition according to claim 1, wherein the carbon fiber component comprises, based on the weight of (A) polysiloxane base composition, 10 to 150% of a carbon fiber with average length of 10 to 2500 μm.

3. The curable organosilicon composition according to claim 1, wherein the component (A) polysiloxane base composition is addition curable.

4. The curable organosilicon composition according to claim 1, wherein the component (A) polysiloxane base composition is condensation polymerization curable.

5. The curable organosilicon composition according to claim 1, wherein the component (A) polysiloxane base composition is organic peroxide curable.

6. The curable organosilicon composition according to claim 1, wherein the length difference between the carbon fiber with average length of 10 μm-600 μm and the carbon fiber with average length of >600 μm-5000 μm is 100-4000 μm.

7. The curable organosilicon composition according to claim 1, wherein the organosilicon composition comprises further fillers other than the carbon fibers in an amount of not greater than 150%, based on the weight of (A) polysiloxane base composition.

8. A method for preparing the curable organosilicon composition according to claim 1, comprising uniformly mixing said (A) polysiloxane base composition and (B) carbon fiber component.

9. A cured organosilicon rubber obtained by curing the curable organosilicon composition according to claim 1.

10. The cured organosilicon rubber according to claim 9, wherein the organosilicon rubber has a volume resistivity of 0.01 to 100000 Ω·cm.

11. A product comprising the cured organosilicon rubber according to claim 9, as an electrically-conductive element in one or more of fields comprising electronics, automobiles, aerospace, high-speed railway, communication, electric power, medicine and/or wearable intelligent devices.

12. The curable organosilicon composition according to claim 1, wherein the carbon fiber component comprises, based on the weight of (A) polysiloxane base composition, 15 to 150% of a carbon fiber with average length of 60 to 3000 μm.

13. The curable organosilicon composition according to claim 1, wherein the carbon fiber component comprises at least one carbon fiber with average length of 10 μm-600 μm and at least one carbon fiber with average length of >800 μm-3500 μm.

14. The curable organosilicon composition according to claim 1, wherein the weight ratio of the carbon fiber with average length of 10 μm-600 μm to the carbon fiber with average length of >600 μm-5000 μm is 3/1-50/1.

15. The curable organosilicon composition according to claim 1, wherein the organosilicon composition comprises further fillers other than the carbon fibers in an amount of not greater than 20%, based on the weight of (A) polysiloxane base composition.

* * * * *